Aug. 18, 1925.
W. L. ISBILLS
1,550,320
PROJECTING APPARATUS
Original Filed March 16, 1921
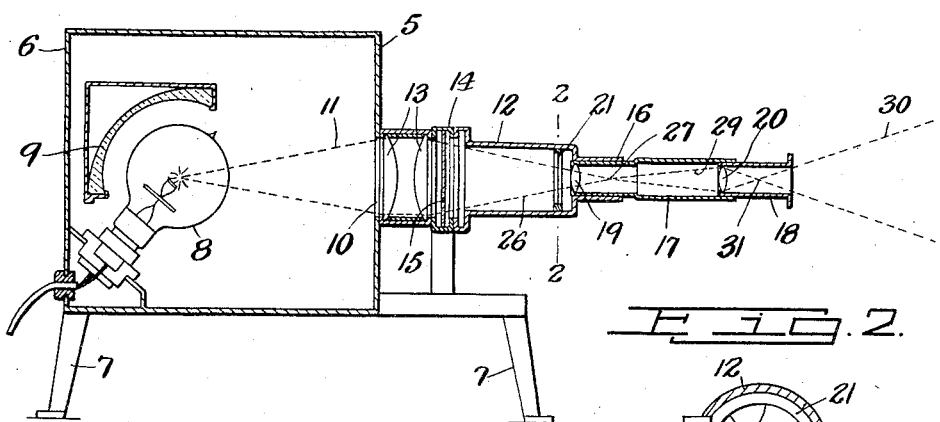
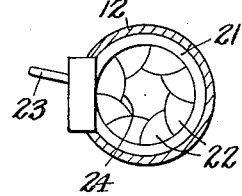
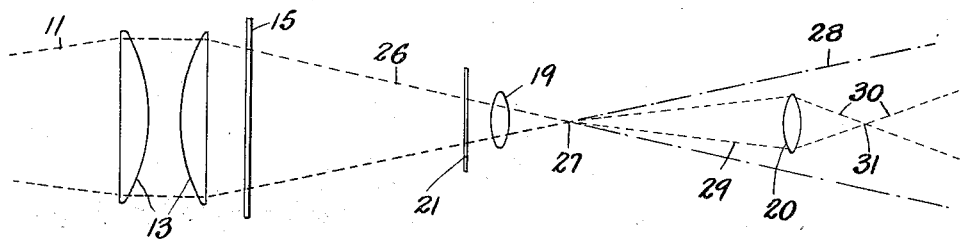
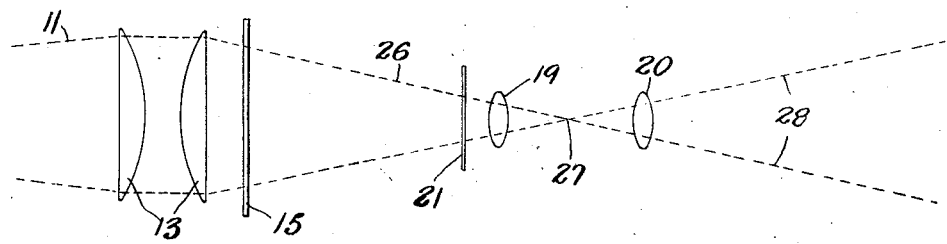
Inventor
William L. Isbills
By his Attorneys Patented Aug. 18, 1925.

1,550,320

UNITED STATES PATENT OFFICE.

WILLIAM L. ISBILLS, OF ELIZABETH, NEW JERSEY.

PROJECTING APPARATUS.

Application filed March 16, 1921, Serial No. 452,845. Renewed January 8, 1925.

*To all whom it may concern:*

Be it known that I, WILLIAM L. ISBILLS, a citizen of the United States, and residing at Elizabeth, in the county of Union and State of New Jersey, have invented certain new and useful Improvements in Projecting Apparatus, of which the following is a specification, such as will enable those skilled in the art to which it appertains to make and use the same.

This invention relates to projecting apparatus and more particularly apparatus of this class adapted to project pictures, objects and the like onto a screen, and the object of my invention is providing improved optical projection for apparatus of the class and for the purpose specified by means of which pictures, slides and the like may be projected, from a right side up position in the apparatus, to a similar position on a screen, as well as an apparatus which is so constructed as to permit of the movement of one of the lenses employed into such positions as to project onto a screen in a right side up position pictures or slides, regardless of the position assumed by said pictures or slides when placed in the apparatus, and with these and other objects in view, the invention consists in an apparatus of the class and for the purpose specified which is simple in construction and operation, and efficient in use and which is constructed and operated as hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal vertical sectional view of a projector lantern showing my improved optical projection mounted in connection therewith;

Fig. 2 is a partial section on the line 2—2 Fig. 1 on an enlarged scale;

Fig. 3 is a diagrammatic view of my improved optical projection as employed in the apparatus shown in Fig. 1; and, Fig. 4 is a view similar to Fig. 3 but showing one of the projecting lenses shown in Fig. 3 in a different position.

In Fig. 1 of the drawing, I have shown a diagrammatic sectional view of a projector lantern 5 for the purpose of illustrating one use of my invention. The lantern 5 comprises in the construction shown, a suitable boxed shaped casing 6 supported on legs 7 and mounted within the casing 6 is a suitable electric light bulb 8 in juxtaposition to which is a reflector lens 9.

The casing 6 is provided in one wall thereof with an aperture 10 through which the rays of light 11 from the bulb 8 are adapted to pass and extending from said casing, in line with the aperture 10 thereof, is a tubular extension 12. Mounted in the inner end portion of the tubular extension 12 are condensing lens 13 outwardly of which the tubular extension 12 is provided with a slide support 14 into and through which lantern slides 15 are adapted to pass.

The outer end portion of the extension 12 is reduced as shown at 16, and adjustably mounted in said reduced portion is a tube 17 within which is another adjustable or telescopic tube 18. The tube 17 carries in its inner end portion a double convex lens 19, and the inner end portion of the tube 18 carries a similar lens 20. By reason of the mounting of the lenses 19 and 20 said lenses may be adjusted toward and from one another.

I also preferably employ in connection with my improved optical projection, and consisting of lenses 13, 19 and 20, an adjustable shutter device 21 which is mounted within the tubular extension 12 in juxtaposition to and inwardly of the lens 19, The shutter device 21 is of a type similar to that employed in cameras, or as used in duplex projecting lanterns for dissolving pictures projected thereby, and is composed of a plurality of radially adjustable segments 22 actuated by a lever or the like 23. The adjustment of the segments 22 will regulate the size of the aperture 24 formed in the shutter device as with similar devices of this class.

In projecting apparatus of the class under consideration namely, projector lanterns, motion picture projecting machines and the like, it has heretofore been the custom to project pictures or lantern slides by said apparatus onto a screen in a right side up position by mounting said pictures or slides in the apparatus in an inverted position, and in Fig. 4 of the drawing, I have diagrammatically illustrated the arrangement of the lenses or optical projection which will project the picture or slide 15 placed in the lantern in an inverted position, onto a screen in a right side up position, that is to say, the subject matter upon the picture or slide as positioned in Fig. 4 will be inverted and projected onto a screen in a right side up position. This result is accomplished or produced by the crossing of the rays of light, indicated by the dotted lines 26, at 27 centrally between the lenses 19 and 20 as positioned in said figure.

As hereinbefore stated the method of projection as diagrammatically illustrated in Fig. 4 is old and my invention consists primarily in the optical projection which is diagrammatically illustrated in Fig. 3 of the drawing, in which the lens 20 is moved from the position shown in Fig. 4 out of focus with the lens 19 and out of the direct path of the rays 28 to a position at which the picture at the crossing or turning point 27 will be reflected or transmitted onto the lens 20 as shown or indicated by the rays of light illustrated by the dotted line 29.

It will be seen on a consideration of Fig. 3 of the drawing that the picture or slide 15, or the subject matter thereon is projected to and through the lens 19, as illustrated by the light rays 26, and the subject matter of said picture or slide will be reversed at the crossing point of said rays at 27 beyond the lens 19 from which point the picture is reflected or transmitted to the lens 20 in its reversed state, and said picture is projected from the lens 20 in the manner illustrated by the dotted lines 30 in said figure, which represents the projected light rays from said lens, and it will be noted that at a predetermined distance outwardly of said lens the picture or subject matter of the picture or slide is again reversed at the crossing point 31. In other words with the optical projection shown in Fig. 3, if a picture or slide is placed in the projecting apparatus, in which said projection is employed, in a right side up position, the subject matter of said picture will be reversed at 27 or turned into an inverted position, after which the subject matter of said picture or slide is again turned at 31 and projected onto a screen in a right side up position, and this result has heretofore been impossible with projecting apparatus of the class under consideration, as it has always been essential to insert a picture or slide into a projecting apparatus in an inverted position in order to project it onto a screen in a right side up position.

It will be apparent, however, that by providing the adjustable or telescoping tubes 17—18, the position of the lens 20 may be controlled and regulated so that a picture may be projected onto a screen in a right side up position regardless of the position assumed by the picture or slide in the apparatus, that is to say, if the picture is placed in the apparatus in a right side up position the lens 20 will be moved into the position shown in Fig. 3, but if said picture is placed in the apparatus in an inverted position, such lens will be moved into the position shown in Fig. 4.

By employing the shutter device 21, I find that by adjusting the separate segments 22 thereof inwardly or outwardly the picture projected onto a screen will be produced more clearly and brighter than with the lenses 19 and 20 alone, but I am not necessarily limited to the use of this shutter device, as any other means may be employed to accomplish this result, nor am I limited to any specific construction or character of projecting apparatus, and various changes and modifications of the construction and arrangement of parts herein shown and described may be made, within the scope of the appended claims, without departing from the spirit of my invention or sacrificing its advantages.

Having fully described my invention, what I claim as new and desire to secure by Letters Patent, is:—

1. In a projecting apparatus an ocular projection mechanism comprising two projecting lenses, one of said lenses being movable relatively to the other into different positions to project a picture or the like onto a screen in the same position assumed by said picture or the like as placed in the apparatus.

2. In a projecting apparatus, an ocular projection mechanism comprising in combination with condensing lenses two projecting lenses approximately of the same size and one of which is movable relatively to the other into different positions whereby in one position of said movable lens a picture placed in the apparatus in an inverted position may be projected onto a screen in a right side up position and whereby in another position of said movable lens a picture placed in the apparatus in a right side up position may be projected onto a screen in a similar position.

3. In a projecting apparatus, a projecting lens construction comprising in combination with condensing lenses two double convex lenses, one of which is movable toward and from the other, said movable lens being adapted to be moved into positions to project onto a screen in a right side up position a picture placed in the apparatus in a right side up or inverted position.

4. In a projecting apparatus a projecting lens construction comprising in combination with condensing lenses two lenses one of which is movable toward and from the other, said movable lens being adapted to be moved into positions to project onto a screen in a right side up position a picture placed in the apparatus in a right side up or inverted position.

5. In a projecting apparatus a projecting lens construction comprising in combination with condensing lenses two lenses one of which is movable toward and from the other, said movable lens being adapted to be moved into positions to project onto a screen in a right side up position a picture placed in the apparatus in a right side up or inverted position, and means cooperating with said lenses for intensifying the light projected onto the screen.

6. In a projecting apparatus a projecting lens construction comprising in combination with condensing lenses two lenses one of which is movable toward and from the other, said movable lens being adapted to be moved into positions to project onto a screen in a right side up position a picture placed in the apparatus in a right side up or inverted position, and a shutter device cooperating with said projecting lenses.

7. In a projecting apparatus, a projecting lens construction comprising in combination with condensing lenses two projecting lenses, one of which is adjustable into and out of focus with the other whereby when said lenses are in focus with each other a picture placed in the apparatus in an inverted position will be projected onto a screen in a right side up position and whereby when said lenses are out of focus a picture placed in the apparatus in a right side up position will be projected onto a screen in a similar position.

8. The herein described projecting lenses for projecting apparatus of the class described comprising in combination with condensing lenses of two projecting lenses mounted in telescoping tubes, said lenses being mounted in independent tubes and one of said tubes being movable relatively to the other to move one of said lenses into different positions relatively to the other of said lenses whereby a picture placed in the apparatus in a right side up or inverted position may be projected onto a screen in a right side up position.

9. The herein described projecting lenses for projecting apparatus of the class described comprising in combination with condensing lenses of two projecting lenses mounted in telescoping tubes, said lenses being mounted in independent tubes and one of said tubes being movable relatively to the other to move one of said lenses into different positions relatively to the other of said lenses whereby a picture placed in the apparatus in a right side up or inverted position may be projected onto a screen in a right side up position, and a shutter device mounted in juxtaposition to one of said lenses and adapted to regulate the intensity of the light projected onto the screen.

In testimony that I claim the foregoing as my invention I have signed my name this 12th day of March, 1921.

WILLIAM L. ISBILLS.